May 5, 1925.
G. W. MACKENZIE
1,536,402
LIQUID DISPENSING APPARATUS
Filed Feb. 16, 1922
4 Sheets-Sheet 1
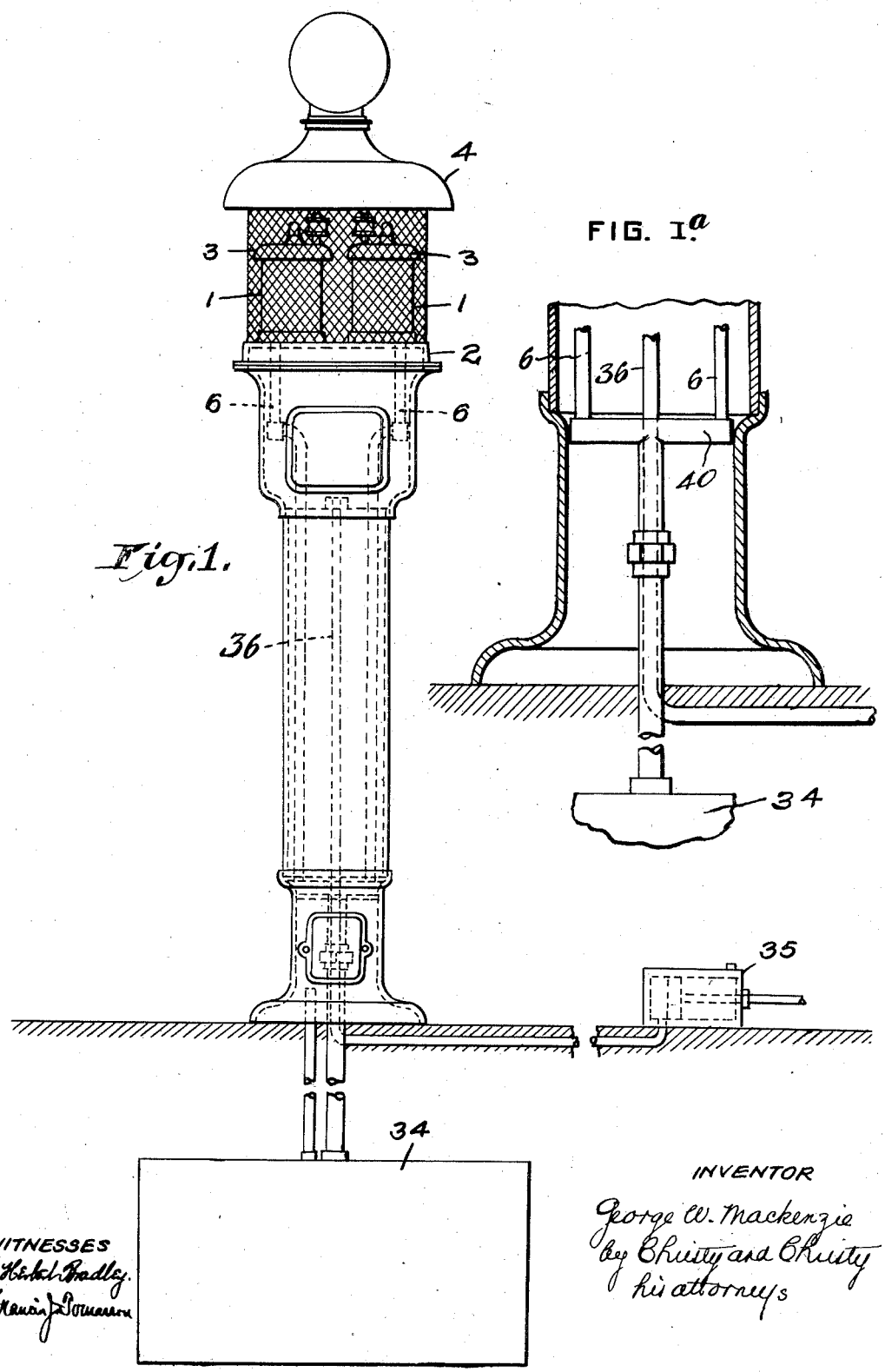

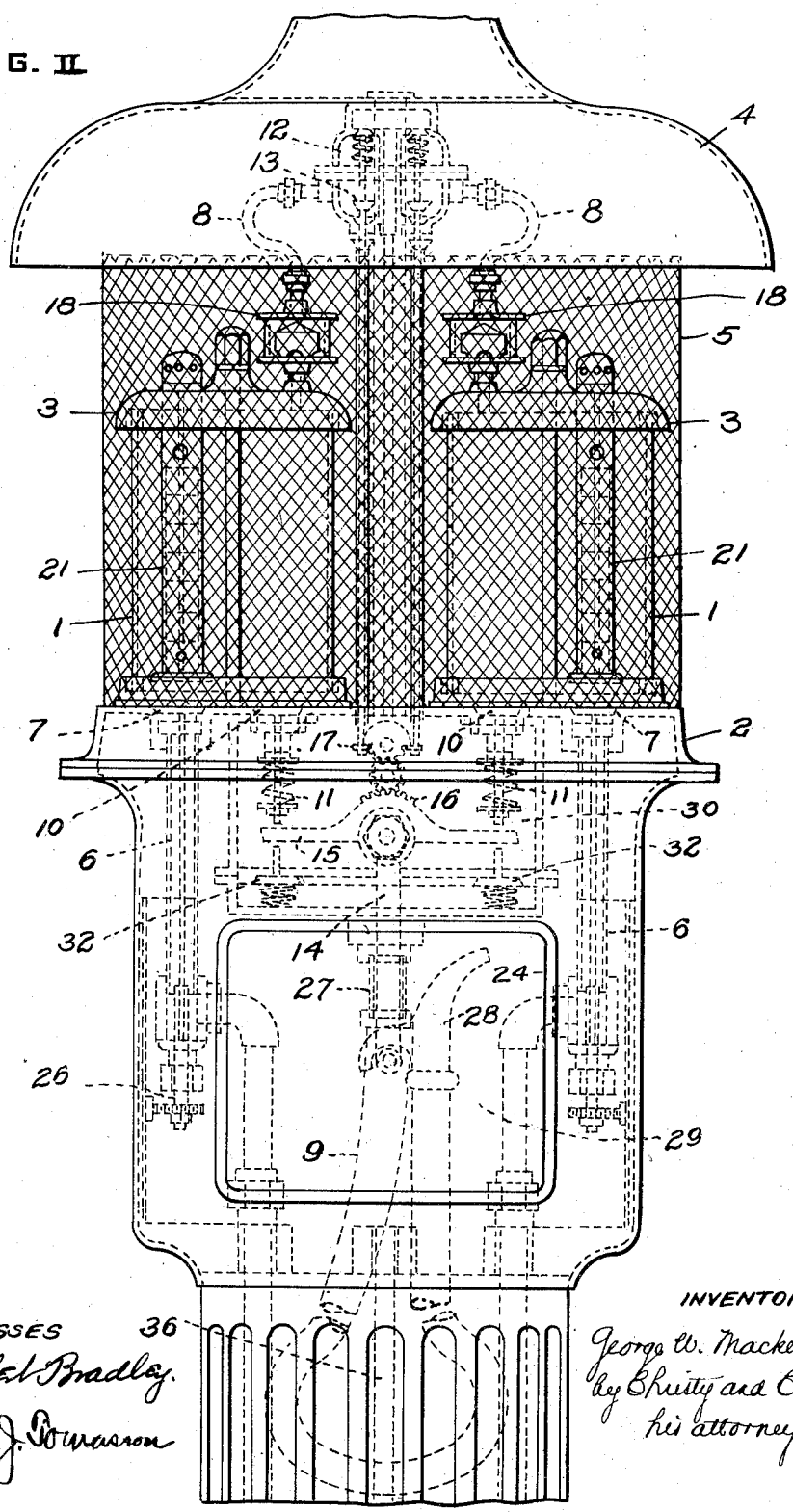

May 5, 1925.  1,536,402
G. W. MACKENZIE
LIQUID DISPENSING APPARATUS
Filed Feb. 16, 1922     4 Sheets-Sheet 3
FIG. III.
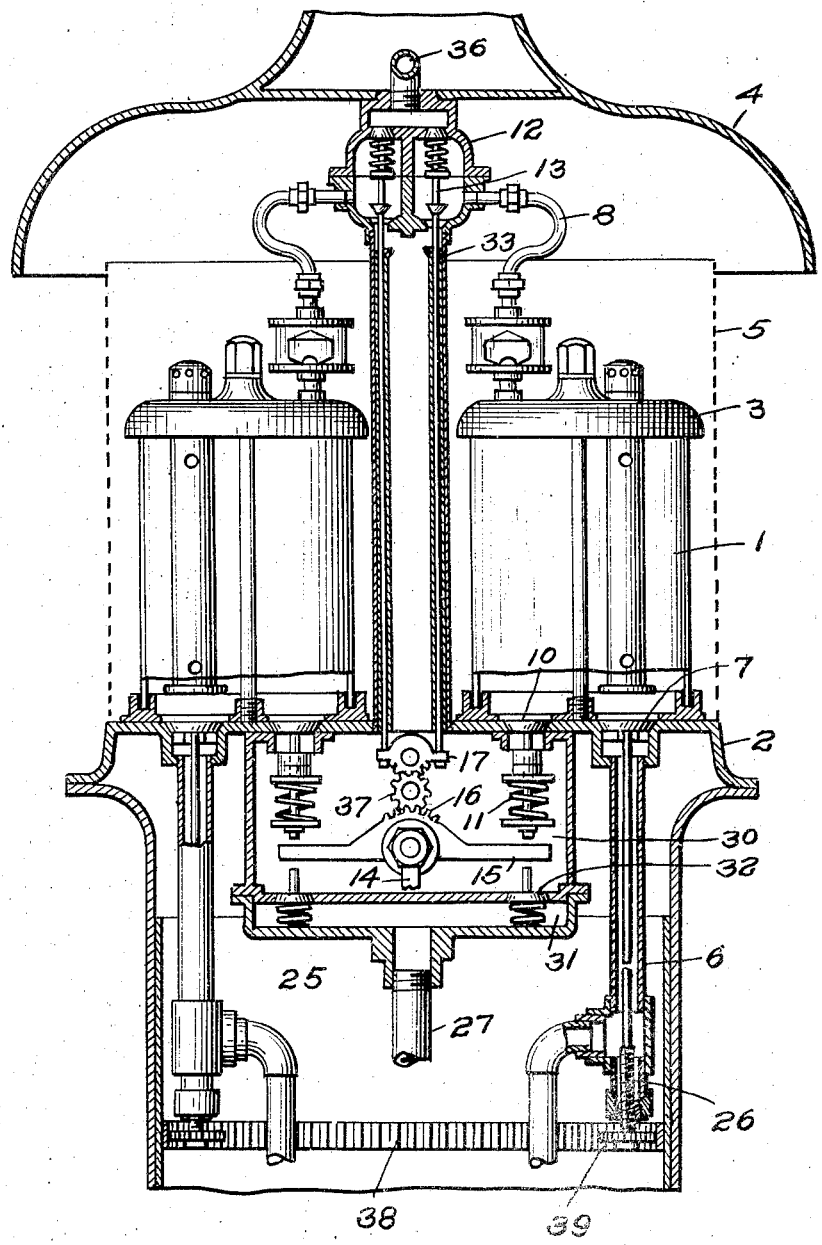

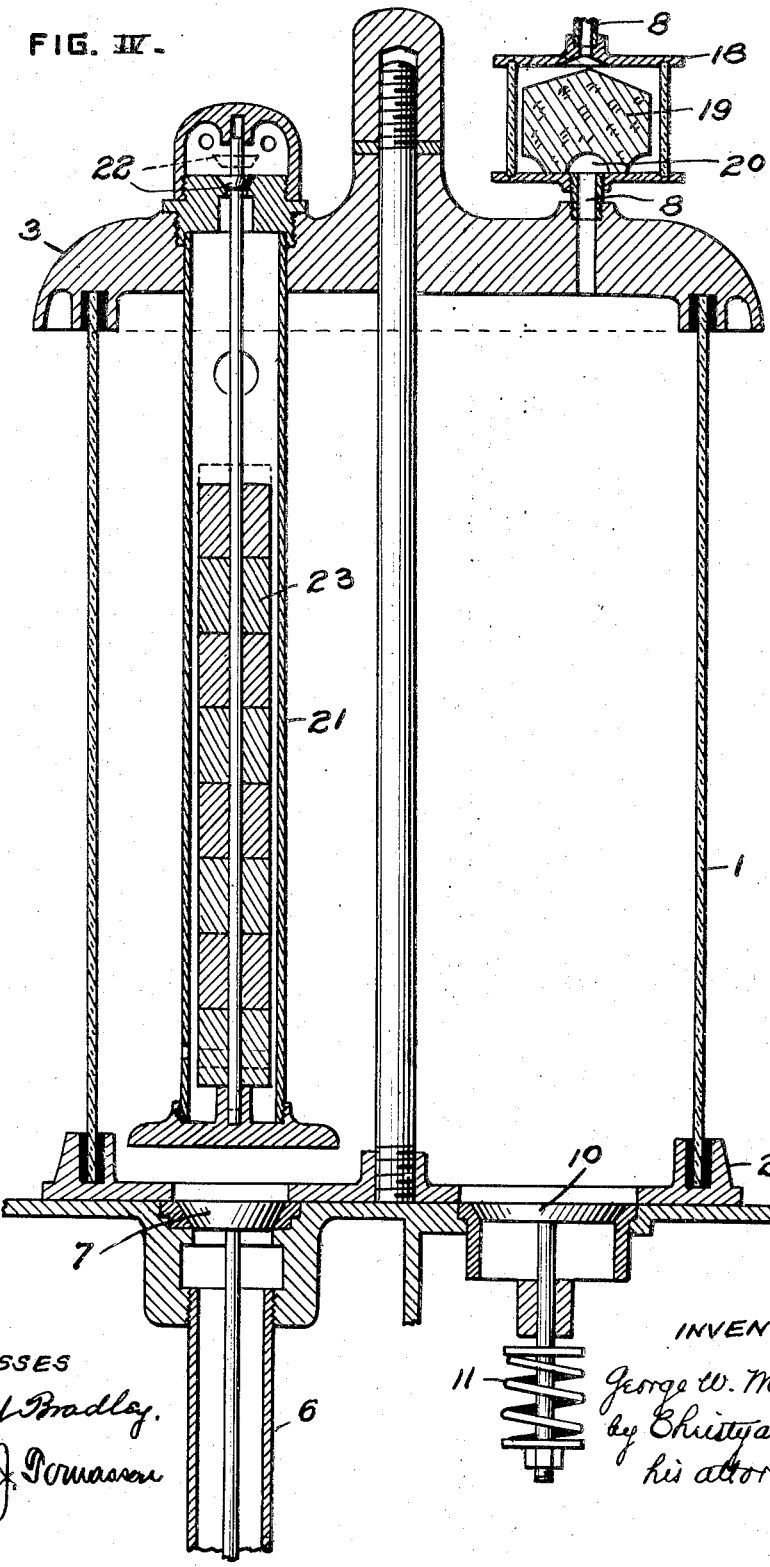

Patented May 5, 1925.

1,536,402

UNITED STATES PATENT OFFICE.

GEORGE W. MACKENZIE, OF BEAVER, PENNSYLVANIA, ASSIGNOR TO SPRINGFIELD MANUFACTURING COMPANY, OF SPRINGFIELD, ILLINOIS, A CORPORATION OF ILLINOIS.

LIQUID-DISPENSING APPARATUS.

Application filed February 16, 1922. Serial No. 536,892.

*To all whom it may concern:*

Be it known that I, GEORGE W. MACKENZIE, residing at Beaver, in the county of Beaver and State of Pennsylvania, a citizen of the United States, have invented or discovered certain new and useful Improvements in Liquid-Dispensing Apparatus, of which improvements the following is a specification.

My invention relates to apparatus for dispensing liquid, and finds practical application in apparatus for vending gasoline to automobile users. In that application I shall describe it. The objects in view are simplicity of mechanical structure and accuracy in measurement.

In the accompanying drawings Fig. I is a view in elevation, and in part diagrammatic, illustrating a complete installation of gasoline vending apparatus, in which my invention is embodied. Fig. Iª is a fragmentary view to larger scale showing in vertical section the lower portion of the apparatus illustrated in Fig. I. Fig. II is a view to larger scale, showing in elevation the upper portion of the fixture shown in Fig. I, adapted to be placed at the curbstone of a highway or other suitable place for the dispensing of gasoline. Fig. III is a view in vertical and medial section of the portion of the apparatus shown in Fig. II. Fig. IV is a view to still larger scale, showing in vertical section one of the measuring cylinders of the apparatus.

The gasoline-dispensing fixture is associated with a suitable reservoir of gasoline. This ordinarily will be a tank 34, Fig. I, sunk underground conveniently near the place where the fixture stands. The tank may, for instance, lie directly beneath this fixture. The fixture carries a measuring chamber, conveniently placed at such height that gasoline may flow from it by gravity to the tank of an automobile standing by. Connection is provided for the flow of gasoline from the reservoir tank to the measuring chamber and for flow from the measuring chamber to the point of delivery. Provision is made for drawing at the will of the operator into the measuring chamber an automatically determined volume of gasoline and for discharging the gasoline after segregation to the point of delivery. Accessory features will appear in the course of the ensuing description.

Referring to Figs. I, II, and III of the drawings, two measuring chambers are shown. This duplication is not of the essence of the invention in its larger aspect, although tributary features of invention are consequent upon it. Each measuring chamber consists of a glass cylinder 1, the two cylinders being borne side by side upon a pedestal 2. The pedestal is erected, as has been intimated, at a convenient place, and is of such height that gasoline will flow from the chambers formed by the cylinders to the gasoline tank of the automobile to be served, drawn up beside the pedestal. The body of the pedestal forms the bottom of the measuring chambers, and the chambers are closed above by cap plates 3. The cap plate 3, like the pedestal 2, will ordinarily be formed of cast iron, and it may be carried on a pillar rising from the pedestal centrally through the cylinder. The cylinder 1 is hermetically joined to the body of the pedestal 2 below and to the cap plate 3 above, and the chamber is accordingly an airtight chamber. A central pillar rising from the pedestal carries a hood 4 which overhangs both chambers, while around both chambers and beneath the rim of the hood extends a reticulated screen 5.

A feed-pipe 6 leads from the gasoline reservoir 34, here shown to be situated directly beneath the pedestal, to each measuring chamber and opens vertically through the bottom wall of the chamber. In the opening a downwardly-closing valve 7 (cf. Fig. IV) is arranged, and this valve is (except under conditions to be particularly mentioned below) freely responsive to differences of pressure upon its upper and lower faces, and so functions as a check valve. Its downwardly-extending stem serves not as a guide merely, but serves other ends also, as presently will be explained.

A pipe 8 leads from each measuring chamber to an air pump 35, by which the pressure of the air within the chamber may be reduced below atmospheric pressure. This pipe opens vertically through the top wall of the chamber (cf. again Fig. IV).

It is manifest that by the apparatus thus far described a sufficient diminution of air pressure within the measuring chamber, effected by the air pump alluded to, will cause gasoline to rise through pipe 6 and, passing valve 7, to enter and fill the measuring chamber.

A receiving chamber 30 underlies both measuring chambers, a delivery chamber 31 underlies the receiving chamber, and from the delivery chamber there is exit by gravity through a delivery hose 9 for carrying the gasoline to the tank in the car of a purchaser. A sight glass 27 may be provided, through which the delivery chamber 31 discharges to the delivery hose 9, to the end that full delivery of each measured unit of volume of gasoline may be observed; but the connection will be clearly understood on comparing Figs. II and III in this regard. The hose when not in service will be withdrawn and hung looped within the hollow pedestal. The nozzle 28 of hose 9 may be provided with a hook adapted to engage a pin 29 upon handle 14 (presently to be described), then when the apparatus is inactive these parts may assume the position indicated in Fig. II. As will more clearly appear in the sequel, the weight of the hose so looped and hung will tend to hold handle 14 and the parts by it operated, in their inactive positions.

A downwardly closing valve 10, backed by a spring 11, controls an opening through the bottom of each measuring chamber, which openings lead to the receiving chamber 30 which underlies both measuring chambers.

The pipe 8 leads from each measuring chamber directly to a valve chest 12, in the opposite upper and lower walls of which are vertically aligned ports controlled by the opposite members of duplicate double valves 13. Each double valve is spring backed, and normally closes the upper port, leaving the lower port uncovered. The lower port communicates with the open air under hood 4; the upper port communicates with the air pump, already mentioned, through the line of communication indicated at 36 in Figs. I and III. This line of communication is not in either figure shown in continuity. The full connection is, for the sake of clearness in showing other parts, omitted; but what is here said will render the structure fully intelligible from the drawings.

Normally valve 10 is closed, and valve 13 is in a position closing communication between the measuring chamber and the air pump. The measuring chamber is then in communication with the open air through valve chest 12. A handle is connected to both valve 10 and valve 13, the connection being such that a swinging of the handle in one direction shifts valve 13, leaving valve 10 closed, and a shifting in opposite direction (allowing valve 13 to resume normal position) opens valve 10. The handle conveniently takes the form of a depending (and, if desired, weighted) crank arm 14, extending from a horizontal shaft. From this shaft extends a second crank arm 15 which extends normally in horizontal position beneath the stem of valve 10; and, integrally with the shaft, are formed gear teeth 16 which mesh with a pinion 37 borne on a parallel shaft. The pinion meshes in turn with gear teeth formed integrally with and concentrically with the axis of turning of a swinging arm 17. This arm 17 normally extends horizontally, and it overlies a shoulder on the prolonged stem of valve 13. The arms 15 and 17 are double and are centrally pivoted beams controlling the movement of the duplicated valves 10 and 13.

With attention particularly upon Fig. III, it will be perceived that when handle 14 is swung to the right valve 13 on the left is shifted and in consequence the measuring chamber on the left is closed to the atmosphere and brought into immediate communication with the air pump (and at the same time the valve 10 on the right is unseated). The motor by which the air pump is driven may be provided with a vacuum switch and automatically brought into operation by the shifting of valve 13 and the consequent change of pressure in the conduit which valve 13 guards. The motor is shown diagrammatically at 35; the vacuum switch alluded to is not shown, but its structure and function are known and require no illustration. The invention is not conditioned on this permissible accessory mechanism. Communication with the air pump being established, and the air pump exerting suction through pipe 8, it is manifest that the effect of the swinging of handle 14 to the right is to cause gasoline to be drawn from the reservoir and to ascend through pipe 6 into the receiving chamber on the left. The rising tide of gasoline passes the now unseated valve 7 and fills the measuring chamber. Means presently to be described are provided, limiting the extent of the rise of gasoline. An ensuing swing of the handle from right to left first releases valve 13 on the left and allows it to return to normal position. Suction is then relieved upon the left-hand measuring chamber, and the chamber is vented to the open air. At the same time valve 7 in the bottom of the measuring chamber closes. Further swing of handle 14 to the left unseats valve 10 in the bottom of the now filled left-hand measuring chamber, and allows the gasoline segregated in the measuring chamber to descend into the receiving chamber 30.

Communication from receiving chamber 30 to delivery chamber 31 is through ports in the bottom of chamber 30 controlled by upwardly closing spring backed valves 32.

These valves are provided with upwardly extending stems so arranged that the same swing of beam 15 which effects unseating of one of valves 10 effects unseating also of one of valves 32. Communication from delivery chamber 31 to delivery hose 9 is always free. The consequence is that when a valve 10 is unseated and a unit of volume previously segregated escapes from a measuring chamber it passes by gravity without hindrance to the tank in the purchaser's car.

The means which I find adequate to limit with precision the extent of rise of the tide of gasoline in the measuring chamber, and so to measure the volume delivered on each successive operation of the apparatus are best shown in Fig. IV. Immediately above the measuring chamber and in line of suction pipe 8 and between measuring chamber and valve chest 12 already described, is arranged a second valve chest 18. This valve chest may conveniently be formed of a glass cylinder with cast iron heads, the parts united in hermetically tight joints. This cylindrical valve chest is arranged with its axis vertically disposed directly above the cover plate 3 of the measuring chamber. Pipe 8 leads vertically from the measuring chamber through the lower head of the cylindrical valve chest, and through the upper head the pipe 8 leads on to valve chest 12. Within valve chest 18 is arranged a valve 19. It has a body, conveniently cylindrical, which fills in large part the chamber within the valve chest, and it is provided above with a valve face adapted by upward movement to come to a seat and close communication through suction pipe 8. The specific gravity of the valve member 19 is preferably less than gasoline, and in virtue of that characteristic it is a float valve. It may be formed, for example, of cork, incased in metal. This valve body is so proportioned and positioned that the suction exerted through pipe 8 will be ineffective alone to draw it to its seat, but when in the course of operation the tide of gasoline rises and begins to submerge the valve, its effective weight will diminish until the tendency to flotation and the suction action through pipe 8 together will cause it to rise and close the port. Thus at a predetermined point in the course of operation the influence of suction is cut off and gasoline in predetermined volume, no more no less, stands drawn in the measuring chamber. At once the closing of valve 7 (of which mention will presently be made again) segregates this precisely measured volume. The essentially cylindrical float may be grooved as at 20 to allow free flow of air through valve chest 18, even though this float valve be resting by gravity at the lower limit of its range of movement.

The side walls of the measuring chamber are, as has been said, conveniently formed of glass, and in virtue of that feature of structure the customer may see that he is honestly served with full measure. But the customer may be inattentive, and it would be possible (but for the apparatus presently to be explained) for a dishonest attendant (the attention of the customer being diverted) to shift the valves before the cylinder from which delivery is being made is entirely emptied. And so the customer might be given short measure. I prefer, therefore, to provide additional means to prevent such fraudulent practice, and such means I shall now describe.

Referring particularly to Fig. IV, a tube 21 is secured in an orifice in the cap plate 3 of the measuring chamber. It depends vertically to or near to the bottom of the chamber. Within this tube the level of the gasoline is maintained uniform with the level in the chamber surrounding the tube, as by means of holes formed through the tube near its upper and lower ends. As shown, the lower end of the tube is closed and, aligned with the gasoline inlet, forms a baffle plate to prevent the surging up of the incoming volume of gasoline. But that is another matter, and does not concern the functioning of the tube for the object now in view. The orifice in the cap plate 3 which tube 21 surrounds is provided with a downwardly-closing valve 22, whose stem extends through the length of tube 21. On the stem are strung floats 23. They may be formed of suitable material, cork for example properly protected from saturation. When the measuring chamber is empty valve 22 rests by gravity on its seat, and when valve 22 is so seated suction may be set up by the means already described; to draw gasoline from the reservoir into the measuring chamber. As gasoline rises in the measuring chamber the valve will be held to its seat by atmospheric pressure exerted upon it from above, which, so long as suction is exerted and the pneumatic pressure within the measuring chamber is by the action of the air pump reduced below normal atmospheric pressure, overcomes the buoyancy of the gradually submerged floats 23. When, however, the measuring chamber has been filled and in sequence thereafter the valve 13 has been shifted and the pressure within the chamber has been restored to atmospheric, then the buoyancy of floats 23 will be effective to lift valve 22 from its seat. When once lifted, valve 22 buoyed up by floats 23 will not return to its seat until the measuring chamber has emptied. Thus if fraud were attempted, the patent fact of the partially emptied measuring chamber would be a certain disclosure of the fraud.

There is permissible latitude in the actual cubic capacity of floats 23—latitude which may be widened by employing for the floats materials varying in specific gravity. This latitude makes it possible, by varying the number of floats, to vary the effective cubic capacity of the measuring chamber. The floats may have uniform size—each say a cubic inch. Herein are additional means for the accurate adjustment of the volume of gasoline delivered on the operation of the machine.

Provision is made that the measuring chamber shall not remain indefinitely filled with gasoline, but that when the apparatus is put in condition of inaction (as when closed for the night) the measuring chamber will automatically be drained. The pedestal conveniently encloses the pipes 6, the operating handle 14, and the mechanism controlled thereby, and an opening 24 in the pedestal is provided, through which the delivery hose 9 may be extended and withdrawn again. A door is provided for this opening. When the apparatus is to be standing inactive the door will naturally be closed; when it is made ready for service, the door is opened. The door conveniently takes the form of a partial cylinder 25 coaxial with the essentially cylindrical pedestal and adapted by rotation on its axis alternately to cover and uncover opening 24. On the inner face of this cylindrical door I form a horizontally extending circular rack 38, and I so proportion the parts that pinions 39 borne on stems 26 aligned with the stems of valves 7 mesh with this rack. Pipes 6 are elbowed, as shown in Figures I and III, to the end that the rack-and-pinion engagement described may be arranged externally of pipe 6, but yet that the stems 26 may pass vertically through pipe walls. Stems 26 make screw-threaded engagement with nuts set in the pipe walls, to the end that stem rotation shall be attended with stem advance and retraction longitudinally. Furthermore, the passage of the stems 26 through the pipe walls is made tight with suitable glands. As particularly shown in Figure III, the stems 26 are aligned with the stems of valve 7. There is normally no contact between the stems 26 and the stems of the valves, and such being the case, valves 7 normally function merely as check valves in the bottom of chambers 1. When, however, by rotation of the door the stems 26 are impelled upward, they engage the stems of valve 7 and by such engagement unseat them. It remains only to say that the parts are so co-ordinated that when door 25 is open, rotation of the stems has caused the stems 26 to recede downward, leaving valves 7 free to serve as check valves, but when door 25 is closed, rotation of stems 26 has caused them to advance in an upward direction, to abut upon stems of valves 7, to unseat valves, and to hold them raised from their seats. In considering what has just been said the fact will be borne in mind that in normal service, when door 25 is closed, handle 14 already stands in the vertical position shown in Fig. I. When the handle is in this position both measuring chambers are vented to the air. And this is a condition which prevents accumulation of pressure within the measuring chambers in consequence of any evaporation of gasoline.

Careful consideration of Fig. I will show that the springs which back valves 10 and 32 tend always conjointly to carry beam 15 to the horizontal position shown. It follows that immediately when the operator, having swung handle 14 to right or left, releases it, the beam 15 will swing to horizontal and the previously open valve 10 will close, its opposite complementary valve 10 being already closed. At the same time and in consequence of the same swinging of beam 15 the drawing of gasoline into the measuring chamber will cease. The weight of the hose when hooked upon handle 14 will, as has already been noted, tend also to bring the handle to neutral position and hold it there. The entire apparatus will stand at rest till the handle 14 is swung again.

Receiving chamber 30 is vented to the air through tubes 33 which rise to a height exceeding the highest level attained by the gasoline rising in the measuring chambers. Incidentally these tubes serve as guides for operating the stems by which valves 13 are shifted. In case one of the valves 18 and corresponding valve 19 should fail to function properly, or if on any other account gasoline should condense or otherwise collect in valve chest 12, the gasoline so collecting will find escape from the valve chest and descending through one or the other of the tubes 33 will be returned to chamber 30.

With attention fixed on the valves 10 and 32, it will be observed that valves 10 are downwardly closing and valves 32 are upwardly closing; that all are normally held to their seats by spring tension; that they are aligned in pairs, a valve 10 standing vertically above a valve 32; and that the crank arms 15 (which duplicated on opposite sides of the pivot point constitute in effect a walking beam) extend between the opposed valve stems in such manner that turning of the handle one way opens valve 10 on one side and valve 32 on the other while the complementary valves remain closed, while turning of the handle in opposite direction effects an opening of the valves which in the first instance remained closed while leaving closed those which in the first instance were opened.

In this twin apparatus shown, it will be observed that the two pipes 6 on either side are interconnected below, through the header 40, Figs. I and Iª, and it will be perceived that, in consequence of such intercommunication, the suction which draws gasoline up on one side has the immediate effect at the start of more firmly seating the valve 7 (cf. Fig. III) on the other side.

Fig. III shows the apparatus in the position it will occupy when, after a time of inaction (as at night), door 25 has been newly opened preparatory to service. By opening the door, valves 7 have been allowed to sink to their seats, but both measuring chambers are empty and vented to the atmosphere. Both valves 19 are open. Handle 14 hangs downward, in intermediate inactive position.

When service is to be begun, nozzle 28 is unhooked from its support and hose 9 is drawn out through the opening 24 in the pedestal. Handle 14 is then swung, to the left, say. Valve 13 on the right is shifted and, the air pump having already been set in operation (or perhaps automatically set in operation), evacuation of air from the measuring chamber on the right ensues. The consequent suction draws gasoline from the storage tank through pipe 6 on the right and the rising flood of gasoline raises valve 7 and enters and fills the measuring chamber on the right. When the rising gasoline reaches the predetermined level valve 19 automatically closes and the flow of gasoline ceases. If then handle 14 be swung to neutral, the measuring chamber on the right will remain filled.

In order to empty the measuring chamber and to deliver the measured volume of gasoline which it contains, handle 14 must be swung, not to neutral merely, but beyond, to the right. By such further swing valve 10 on the right and valve 32 on the left are unseated, and valve 13 on the right having already resumed its normal position, cutting off the suction effect of the air pump and venting the measuring chamber to the atmosphere, the measured volume of gasoline escapes by gravity through chambers 30 and 31 and through hose 9 to the place of delivery. At the same time the measuring chamber on the left has by a duplicate set of parts been filled, just as the chamber on the right was initially filled. And so operation progresses, the tanks alternately filling and emptying, the one filling simultaneously as the other empties. If after one tank is filled the handle be swung to intermediate position and allowed to remain there, one tank will continue to carry its measured volume, ready to be delivered when the handle is swung further.

When emptying of either chamber has begun, all the contents must be delivered before it can be filled again. This is achieved by the operation of the fraud-preventing valve 22 described above.

When the apparatus is to go out of service, as at night, handle 14 is standing at intermediate position, the hose is carried into the pedestal, and the door 25 is closed. Thereupon both valves 7 are raised from their seats, and whatever gasoline either measuring chamber may contain is drained to the storage tank again.

A tally register may be connected to the shaft on which handle 14 turns, or to either of the other shafts which turn in unison with it, and thus record may be kept of the number of operations. The unit of operation—the volume segregated with each operation and delivered in course—may be such as preferred, one gallon, for example.

Though intended primarily for a gasoline service station, the apparatus manifestly may be used for dispensing liquid of any sort in predetermined volumes, large or small.

I claim as my invention:

1. In liquid-dispensing apparatus the combination of a liquid reservoir, a measuring chamber, a conduit through which communication is had from liquid reservoirs to measuring chamber, a check valve in said conduit, an air-exhausting mechanism, a conduit through which communication is had from the measuring chamber to the air-exhausting mechanism and from the open air to the measuring chamber, a valve controlling alternate communication from said measuring chamber to the air-exhausting mechanism and from the open air to said measuring chamber and normally maintaining communication from the open air to the measuring chamber, a discharge orifice in the bottom of said measuring chamber, a spring-backed valve normally closing said orifice, and oscillatory means for shifting in alternation the valve controlling alternate communication as aforesaid and the valve in the discharge orifice of the measuring chamber.

2. In a liquid-dispensing apparatus the combination of a measuring chamber and means for exhausting air from the measuring chamber, thereby sucking liquid into the measuring chamber from a source of supply, a port in the measuring chamber leading to the open air, a float in the measuring chamber, and a downwardly and inwardly closing valve controlling said port and secured to said float, the proportions and arrangement being such that, the chamber being empty, suction and gravity co-operate to hold the valve to its seat, and that the buoyancy of the float due to rise of liquid in the chamber is ineffective to unseat the valve so long as suction continues, but is effective after suction has been relieved to unseat the valve and to hold the valve unseated until the chamber is emptied again of liquid.

3. In liquid dispensing apparatus the combination of a hollow pedestal, a measuring chamber carried by said pedestal, a liquid supply pipe leading through said pedestal and opening to said measuring chamber, a check valve in the line of communication through supply pipe to measuring chamber, a port in said pedestal, a rotatable cylindrical door for said port, a rotatable stem mounted in a fixed bearing and movable longitudinally therein when rotated, and means for imparting rotation from door to stem, said stem and said check valve so relatively arranged that longitudinal movement of said stem will unseat said valve.

4. In liquid-dispensing apparatus the combination of a source of supply, twin measuring chambers arranged above said source of supply, supply pipes leading from said source of supply to each of said measuring chambers, a downwardly seated check valve controlling communication from said source of supply through each of said pipes to the several measuring chambers, a communicating passage opening between the two supply pipes at points below the said check valves, and means for exerting suction alternately in one or the other of the said measuring chambers.

5. In liquid dispensing apparatus the combination of a source of liquid supply, a measuring chamber, an air pump, and a delivery line, a valve-controlled line of communication from said source of supply to the measuring chamber, a valve-controlled line of communication from the measuring chamber alternately to said air pump and to the open air, valve-controlled communication from measuring chamber through said delivery line, a member movable in opposite directions against spring tension and by such opposite movements effecting alternately communication from such source of supply through said measuring chamber to said air pump, and communication from the open air through said measuring chamber to said delivery line.

In testimony whereof I have hereunto set my hand.

GEORGE W. MACKENZIE.

Witness:
FRANCIS J. TOMASSON.